United States Patent
Gilday et al.

(10) Patent No.: US 8,250,351 B2
(45) Date of Patent: Aug. 21, 2012

(54) SYNCHRONIZATION OF TWO INDEPENDENT RESET SIGNALS

(75) Inventors: David Michael Gilday, Chatteris (GB); Peter Logan Harrod, Cambridge (GB)

(73) Assignee: ARM Limited, Cambridge (GB)

(*) Notice: Subject to any disclaimer, the term of this patent is extended or adjusted under 35 U.S.C. 154(b) by 609 days.

(21) Appl. No.: 12/314,020

(22) Filed: Dec. 2, 2008

(65) Prior Publication Data
US 2010/0138640 A1 Jun. 3, 2010

(51) Int. Cl.
*G06F 15/177* (2006.01)
(52) U.S. Cl. .............................. 713/1; 713/2; 713/100
(58) Field of Classification Search .......... 713/500–503, 713/375, 330, 340, 1–2, 100; 327/141–142
See application file for complete search history.

(56) References Cited

U.S. PATENT DOCUMENTS

| | | | |
|---|---|---|---|
| 5,701,420 A * | 12/1997 | Nedwek et al. ............... | 710/104 |
| 5,809,312 A * | 9/1998 | Ansel et al. .................. | 713/300 |
| 6,081,889 A * | 6/2000 | Kitao ........................... | 713/1 |
| 6,275,951 B1 * | 8/2001 | Park .............................. | 713/500 |
| 6,314,515 B1 * | 11/2001 | Miller et al. ...................... | 713/1 |
| 6,480,967 B1 * | 11/2002 | Jensen et al. .................. | 713/600 |
| 6,606,705 B1 * | 8/2003 | Volk .............................. | 713/100 |
| 6,771,100 B2 * | 8/2004 | Ishimi ........................... | 327/142 |
| 6,868,500 B1 * | 3/2005 | Kutz et al. ..................... | 713/300 |
| 7,084,679 B2 * | 8/2006 | Hartfiel et al. ................ | 327/141 |
| 7,183,819 B2 * | 2/2007 | Heinkel et al. ................ | 327/141 |
| 7,405,602 B2 * | 7/2008 | Saitou .......................... | 327/142 |

* cited by examiner

*Primary Examiner* — Raymond Phan
(74) *Attorney, Agent, or Firm* — Nixon & Vanderhye P.C.

(57) ABSTRACT

Reset control circuitry is disclosed, for controlling a first reset signal for resetting at least a first portion of a circuit and a further reset signal for resetting at least a second portion of said circuit, said reset control circuitry comprising: an input for receiving an input first reset signal; an input for receiving an input further reset signal; an output for outputting an output first reset signal; and an output for outputting an output further reset signal; said reset control circuitry being responsive to detecting deassertion of said input first reset signal when said input further reset signal is asserted to delay deassertion of said output first reset signal so that said output first reset signal is deasserted at a same time or later than said input further reset signal.

21 Claims, 5 Drawing Sheets

SYNCHRONIZATION OF TWO INDEPENDENT RESET SIGNALS

BACKGROUND OF THE INVENTION

1. Field of the Invention

The field of the invention relates to data processing and in particular to applying resets to a data processing apparatus.

2. Description of the Prior Art

The application of a reset to a data processing apparatus is known. This reset signal may be an asynchronous signal and therefore it may need to be synchronised to the processor's clock domain. Conventional reset synchroniser circuits are known in microprocessor designs that have a single reset input. It is also known for processors that have multiple reset inputs for these inputs to be synchronised with respect to the device they are resetting. However, there is generally no interconnection between such multiple reset inputs or their synchronisation.

The application of two independent resets to a data processing apparatus is used, for example, in a processor that has some diagnostic function such as debug circuitry. Such a processor typically requires two independent resets, a system reset and a diagnostic reset. This allows the system logic to be reset independently of the diagnostic logic, thereby enabling a system to be monitored through application of a system reset. In such a system both resets will typically need to be applied at system power-on and typically the system reset will also need to be a superset of the diagnostic reset, in other words if the diagnostic reset is driven, then the system reset must also be driven.

At power on the system reset may be delayed by a reset controller in response to detection of the processing apparatus not being ready, a PLL not being locked for example. As the two resets are independent and may be synchronised independently then the diagnostic reset may not be similarly delayed and diagnosis, for example debug, may start before the system is ready to operate, e.g. PLL is not locked. This can lead to errors. It would be advantageous to avoid this problem, while maintaining the possibility to reset either the system or the diagnostic circuitry independently of each other.

SUMMARY OF THE INVENTION

A first aspect of the present invention provides reset control circuitry for controlling a first reset signal for resetting at least a first portion of a circuit and a further reset signal for resetting at least a second portion of said circuit, said reset control circuitry comprising: an input for receiving an input first reset signal; an input for receiving an input further reset signal; an output for outputting an output first reset signal; and an output for outputting an output further reset signal; said reset control circuitry being responsive to detecting deassertion of said input first reset signal when said input further reset signal is asserted to delay deassertion of said output first reset signal so that said output first reset signal is deasserted at a same time or later than said input further reset signal.

In some processors, two reset signals may be asserted independently of each other and yet one may be delayed by the system to account for certain system conditions while the other is not. The present invention addresses such a problem by providing reset control circuitry that is able to delay the deassertion of one reset signal in dependence upon the other reset signal. Thus, two reset signals that may be generated and routed independently of each other can in effect be synchronised with each other by the use of this circuitry. This provides a simple yet effective way of synchronising the two signals with each other while maintaining their independence.

In some circumstances the circuitry producing the two reset signals are developed independently of each other. For example, there may be a system reset and a diagnostic reset and in such a circumstance although the diagnostic circuitry can see the system reset it does not have access to its generation circuitry. In such a case, delays in the system reset reaching the processor are beyond the control and sight of the diagnostic circuitry. Thus, providing an apparatus that can control the diagnostic reset based not on the signals generating or modifying the system reset but on the reset itself are a simple yet effective way to address this issue.

In some embodiments, said reset control circuitry is responsive to receiving said input first reset signal and said input further reset signal to output said input first reset signal as said output first reset signal and to output said input further reset signal as said output further reset signal when said reset control circuitry does not detect deassertion of said input first reset signal when said input further reset signal is asserted.

In most circumstances the reset control circuitry simply receives the input reset signals and passes them through the circuitry such that they are output unchanged. It only acts to amend them and control the signals output when it detects deassertion of the input first reset signal when the input further reset signal is still asserted.

In some embodiments, said reset control circuitry is responsive to detecting deassertion of said input first reset signal when said input further reset signal is asserted to control deassertion of said output further reset signal such that said output further reset signal is deasserted at a same time or later than said output first reset signal.

Embodiments of the present invention can also act to delay the further reset signal so that this is deasserted at a same time or later than the first reset signal that is output. The deassertion of the output first reset signal will have been delayed if the input further reset signal was asserted when it was deasserted, and it may be advantageous for the further reset signal to be asserted after or at least at the same time as the output first reset signal. Thus, where the output of the first reset signal is delayed it may also be advantageous to delay the output of the further reset signal. This could be used for example to ensure synchronisation with the circuits where the reset signals are asynchronous, or it may be used to ensure that the relative timing of the two signals is maintained.

The reset signals received may be synchronous reset signals or they may be asynchronous reset signals.

In some embodiments, said input first reset signal and said input further reset signal comprise asynchronous reset signals, said reset control circuitry comprising synchronising elements such that said output first reset signal comprises a synchronous signal synchronised to a clock clocking said at least a first portion of said circuit and said output further reset signal comprises a synchronous signal synchronised to a clock clocking said at least a second portion of said circuit.

The reset control circuitry may additionally comprise synchronising elements that can synchronise the input asynchronous signals to the clocks of the circuits that they are controlling. This can ensure that the timing of receipt of the signal can be determined with respect to a clock pulse.

In other embodiments, said first reset signal comprises a signal synchronous to a clock clocking said at least a first portion of said circuit and said further reset signal comprises a signal synchronous to a clock clocking said at least a second portion of said circuit.

Where the input reset signals are already synchronous signals then synchronising elements are not required in the reset control circuitry.

Although, the first portion of the circuit and second portion of the circuit can comprise a number of different elements, in some embodiments said at least a first portion of said circuit comprises diagnostic circuitry and said at least a second portion of said circuit comprises a processor associated with said diagnostic circuitry.

Embodiments of the present invention are particularly applicable to diagnostic circuitry associated with a processor. Such a system often comprises two independent reset signals, one for the processor and one for the diagnostic circuitry. It is important that the diagnostic circuitry can diagnose faults within the processor during reset and thus, it needs to be allowed to run during a system reset. However, if the reset of the system is delayed after power up while various parts of the system become operational then it is important that the diagnostic circuitry reset is also delayed otherwise it may commence too early when the system is not properly operational.

In some embodiments, said input first reset signal comprises a reset signal generated in response to power on.

As mentioned previously the input first reset signal may be generated in response to power on and it is in these situations in particular, that it may need to be delayed to avoid it commencing when the system is not ready.

In some embodiments, said first reset signal comprises a diagnostic reset signal, said diagnostic reset signal being generated in response to power on and in response to at least one further condition.

The diagnostic reset signal may be generated in response to power on. It may also be generated at other times in response to a further condition such as a request for diagnosis to be performed.

In some embodiments, said further reset signal comprises a processor reset signal.

In some embodiments, said further reset signal comprises a plurality of further reset signals, said reset control circuitry being responsive to detecting deassertion of said input first reset signal when at least one of said plurality of input further reset signals is asserted to delay deassertion of said output first reset signal so that said output first reset signal is deasserted at about a same time or later than a latest deassertion of said at least one of said plurality of input further reset signals.

Although there may just be a single further reset signal there may be a plurality of them and the reset control circuitry can respond to several reset signals delaying the assertion of the first reset signal so that it is deasserted at about the same time or later than the latest deassertion of the plurality of input further reset signals.

In some embodiments, said reset control circuitry is responsive to detecting deassertion of said input first reset signal when at least one of said plurality of input further reset signals is asserted to control deassertion of at least one of said plurality of output further reset signals corresponding to said at least one of said asserted input further reset signal such that said at least one of said plurality of output further reset signals is deasserted at a same time or later than said output first reset signal.

With a plurality of further reset signals as well as delaying the first reset signal the further reset signals can also be delayed so that they are output at the same time or later than the output of the first reset signal. This ensures that the delayed first reset signal is not output after the further reset signals. Thus, the order in which the reset signals is received is maintained.

In some embodiments, said reset control circuitry is responsive to detecting assertion of said input first reset signal when said input further reset signal is not asserted to output said input first reset signal and to assert said output further reset signal.

The reset control circuitry may also be responsive to assertion of a first reset signal to automatically assert the further reset signal if it is not already asserted. This can be used to ensure certain behaviour of a circuit. For example, if the first reset signal is for a diagnostic circuit then when this is reset it may wish to diagnose the processor both during a and following on from reset and therefore, an automatic reset of the processor is generated within the reset control circuitry. As this signal is generated within the reset control circuitry, there is no asserted input further reset signal when the first reset signal is deasserted and thus, there is no delay of the first reset signal. This is advantageous as in the case of for example, a diagnostic reset it is important that it can be deasserted before the processor reset so that diagnosis through a reset can be performed.

In some embodiments said reset control circuitry further comprises a storage element for storing a value indicating said input further reset has previously been asserted, said reset control circuitry being responsive to detecting deassertion of said input first reset signal when said input further reset signal is asserted for a first time following power up such that said value is not stored in said storage element to delay deassertion of said output first reset signal so that said output first reset signal is deasserted at a same time or later than said input further reset signal and not to delay deassertion of said output first reset signal when said value is stored in said storage element.

The need to delay the first reset signal may only occur in response to the first further reset signal after power up, as it is in such a situation that issues with the further reset signal being delayed due to portions of the circuit needing to stabilise correctly occurs. Thus, it may be advantageous to provide a storage element such that the circuit can determine whether or not it is the first assertion of the further reset signal after power up and when it is not, not to delay the first reset signal.

A second aspect of the present invention provides a data processing apparatus comprising a reset management unit; a processor; associated diagnostic circuitry; and reset control circuitry according to a first aspect of the present invention wherein said at least a first portion of said circuit comprises diagnostic circuitry and said at least second portion of said circuit comprises a processor associated with said diagnostic circuitry; wherein said reset management unit is arranged to receive said further reset signal and to delay deassertion of said further reset signal in dependence upon at least one detected condition of said data processing apparatus, said reset management unit being arranged to output said delayed reset signal to said input for receiving said further reset signal of said reset control circuitry.

It should be noted that the diagnostic circuitry may comprise debug circuitry or trace circuitry or any type of diagnostic circuitry. As mentioned previously the present invention is particularly applicable to diagnostic circuitry associated with processors where it may be advantageous to have independent resets and yet be able to control these resets so that if a processor reset is delayed until the processor is able to function properly, for example waiting for a phase locked loop to lock, then it may be advantageous to delay the diagnostic circuitry reset so that it doesn't start before the system is ready.

In some embodiments, said data processing apparatus is configured to generate said first reset signal and said further reset signal in response to a power up signal.

In some embodiments, said data processing apparatus further comprises a phase locked loop wherein said at least one detected condition of said data processing apparatus comprises said phase locked loop not being in a stable locked state.

As mentioned previously a phase locked loop may not lock immediately after power up and thus, resets generated in response to power up may need to be delayed before they are deasserted in response to the condition of the phase locked loop. Delay of the reset for the processor in this way can cause problems if the diagnostic circuitry reset is not similarly delayed. Thus, embodiments of the apparatus recognise this problem and delay the diagnostic reset so that diagnostic functions do not commence before the phase lock loop is locked.

Although, embodiments of the apparatus have been described with respect to one processor, it is clear to the skilled person that the data processing apparatus may comprise further processors the reset signal being a system reset signal for resetting all of these processors.

Alternatively, the data processing apparatus may comprise further processors and have a plurality of reset signals for each of the processors. In such a case the reset control circuitry is responsive a plurality of further reset signals for resetting said processor and said at least one further processor, said reset control circuitry being responsive to detecting deassertion of said input first reset signal when at least one of said plurality of input further reset signals is asserted to delay deassertion of said output first reset signal so that said output first reset signal is deasserted at about a same time or later than a latest deassertion of said at least one of said plurality of input further reset signals.

If there are a plurality of further reset signals then the delay of the deassertion of the first reset signal is simply done in dependence upon the latest deassertion of these further reset signals.

In some embodiments, said reset control circuitry is responsive, to detecting reassertion of said input first reset signal when said input further reset signal is no longer asserted to output said input first reset signal and to reassert said output further reset signal.

In addition to being generated in response to power on, the first reset signal which is a diagnostic reset signal may be generated during processing. In such a case, the reset control circuitry generates a further reset signal and resets the processor. This enables it to diagnose the system during reset.

A third aspect of the present invention provides a method of controlling a first reset signal deassertion of which triggers resetting of at least a first portion of a circuit and a further reset signal deassertion of which triggers resetting of at least a second portion of said circuit, comprising the steps of: receiving said first reset signal and said further reset signal; in response to detecting deassertion of said input first reset signal when said input further reset signal is asserted delaying deassertion of said output first reset signal so that said output first reset signal is deasserted at about a same time or later than said input further reset signal; outputting said first reset signal and said further reset signal.

A fourth aspect of the present invention provides reset control means for controlling a first reset signal for resetting at least a first portion of a circuit and a further reset signal for resetting at least a second portion of said circuit, said reset control means comprising: an input means for receiving an input first reset signal; an input means for receiving an input further reset signal; an output means for outputting an output first reset signal; and an output means for outputting an output further reset signal; said reset control means being responsive to detecting deassertion of said input first reset signal when said input further reset signal is asserted to delay deassertion of said output first reset signal so that said output first reset signal is deasserted at a same time or later than said input further reset signal.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
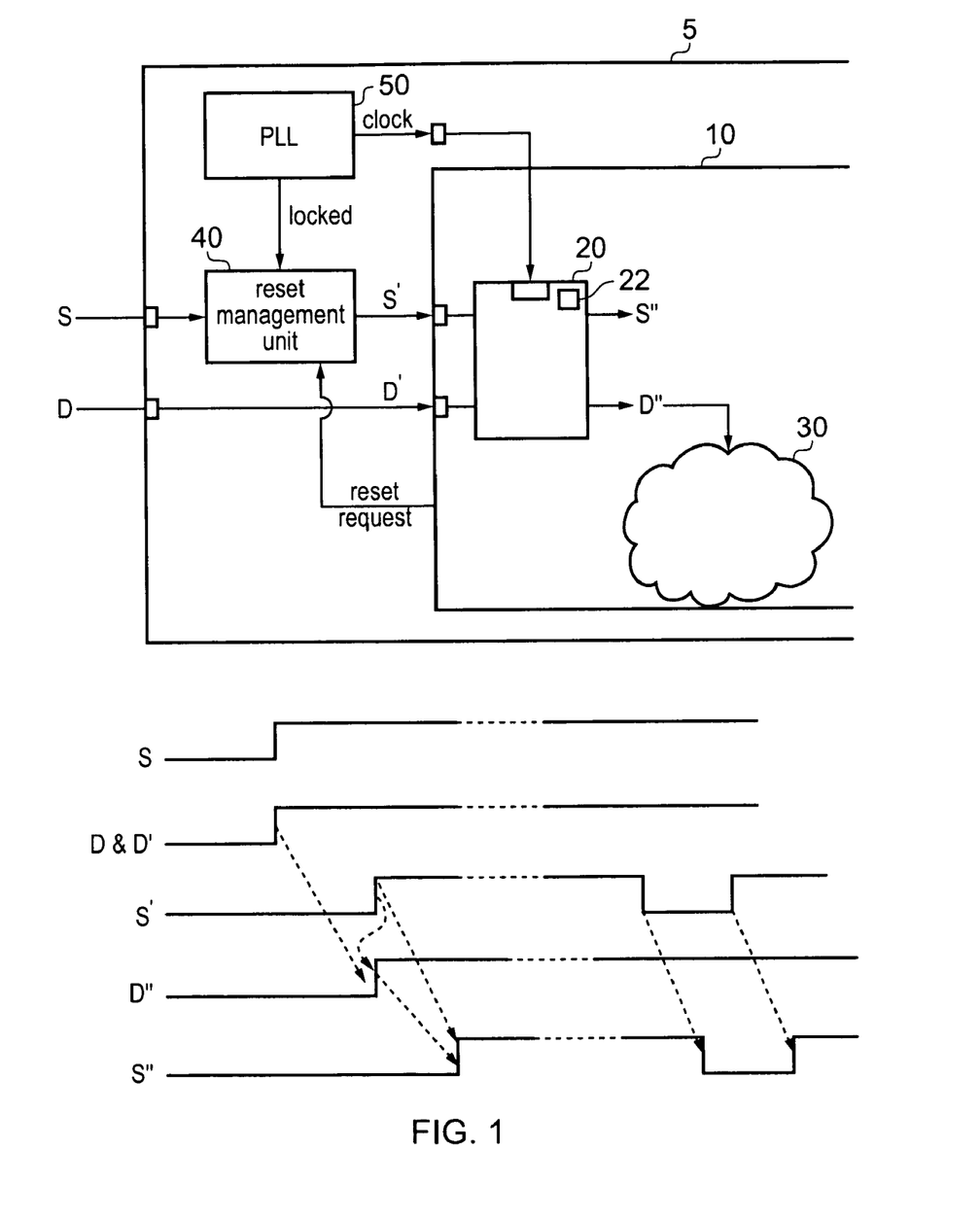
FIG. 1 shows a data processing apparatus comprising reset control circuitry according to an embodiment of the present invention.

FIG. 1 shows a data processing apparatus 5 having a processor 10, reset control circuitry 20, diagnostic circuitry 30, a reset control management unit 40 and a phase locked loop 50. Data processing apparatus 5 receives a system reset signal S and a diagnostic reset signal D. These are shown as being input from outside of the data processing apparatus. They may, alternatively, be internally generated, for example in response to a power on signal.

Data processing apparatus 5 comprises reset control management unit 40 which controls the resetting of the system. When reset control management unit 40 detects the deassertion of the reset signal S it does not output the deasserted signal to processor 10 until is detects that the phase locked loop 50 which clocks processor 10 and also reset control circuitry 20 has locked. When it detects this it knows that it is safe for the processor to start operating and thus, it transmits the delayed system reset signal S' to processor 10. This delayed signal is received by reset control circuitry 20 and it is processed and output as system reset signal S". This signal is used to reset processor 10. A diagnostic reset signal D is also received at data processing apparatus 5 and this is passed straight through to processor 10 where it is received as D'. D' is, as can be appreciated, the same as D. This signal is input to reset control circuitry 20 and is output from there as D" where it is used to control resetting of diagnostic circuitry 30.

Wave forms showing the timing of these signals are also given in this figure. As can be seen system reset signal S and diagnostic reset signal D are both received in this embodiment at a same time at data processing apparatus 5. As the diagnostic reset signal D does not pass through a control management unit on its way to processor 10 then the signal received at processor 10 D' is the same as the diagnostic reset signal D received. A system reset signal S is however passed through reset control management unit 40 and it is delayed by this reset control management unit until the reset control management unit detects that phase locked loop 50 has locked. When it detects that it is locked, it then outputs the deassertion of the reset control signal S'.

It should be noted that in this diagram negative logic is used and deassertion occurs when this signal goes high. Thus, there is a delay between the received reset signal S being deasserted and the deserted reset signal S' being input to processor 10. Thus, the diagnostic reset signal D' that is input to processor 10 and indeed reset control circuitry 20 is deasserted before the system reset signal S'. In this case, the reset control circuitry 20 acts to delay the deassertion of the diagnostic reset signal D' so that the output signal D" is deasserted at the same time or later than the system reset signal S' that is input to the reset control circuitry 20. This ensures that the diagnostic control circuitry 30 is not started before the phase locked loop has locked.

At this point, the deassertion of the diagnostic reset control signal D" output from the reset control circuitry 20 occurs at about the same time as the deassertion of the system reset signal S' received at the reset control circuitry 20. However, it may be advantageous for the diagnostic system to start operating before the system starts operating as then it can be monitored during start up. In such a case, the system reset signal is further delayed so that it is output after the diagnostic reset circuitry. Such a delay can also be used to help synchronise the systems particularly when they are running on different clocks and ensure that the diagnostic circuitry starts operation before the processor does. Thus, diagnosis of the processor during start up is ensured.

Reset control circuitry 20 is also responsive to detecting an input diagnostic reset signal when no system reset signal has been asserted. Such a signal may be generated to commence diagnosis such as debug. Reset control circuitry is responsive to such a signal to assert a system reset signal (reset request in the Figure). This means that diagnosis of the system is performed during system reset. As in this case it is the reset control circuitry 20 that generates the system reset there is no input system reset signal to trigger a delay in the diagnostic reset in this case. This is advantageous as it is important here that the diagnosis is performed during reset.

In some embodiments reset control circuitry 20 comprises a data store 22 that stores a value indicating a previous system reset assertion, this can be used by the reset control circuitry to determine if the system reset is a first system reset after power up (no value stored in data store). This can be used to only delay the diagnostic reset signal in response to a first system reset after power up where issues with the phase locked loop 50 not being locked will occur and cause the system reset to be delayed. Subsequent system resets are not delayed by reset management unit and thus, there is no need to delay the diagnostic reset until after the system reset has deasserted in fact it may be disadvantageous to do so.

Figure 2:
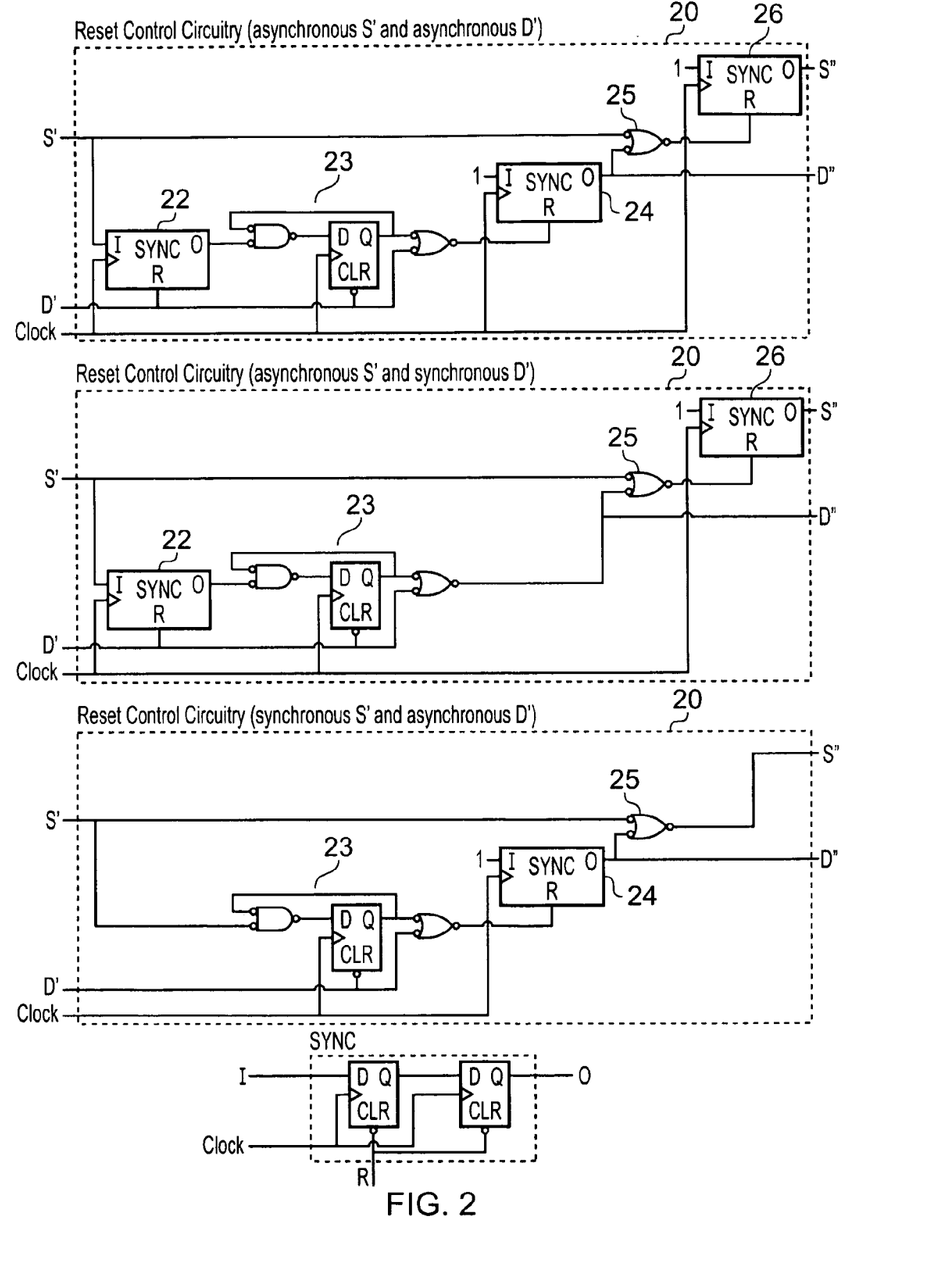
FIG. 2 shows reset control circuitry according to an embodiment of the present invention.

FIG. 2 shows different examples of reset control circuitry 20, for processing different reset and diagnostic reset signals some being synchronous signals and thus, not requiring synchronisation to the clock, only synchronisation with each other and others being asynchronous signals that require synchronisation with the clock signal as well.

In the first example reset control circuitry 20 receives an asynchronous reset signal S' from reset management unit 40 of FIG. 1, and an asynchronous diagnostic reset signal D'. This circuitry comprises a synchroniser 22 for synchronising the system reset signal S' with respect to the clock, to generate a synchronous system reset signal that is to be used in the delay circuit 23 for delaying the diagnostic reset signal D' with respect to the system reset signal S' that may have been delayed by reset management unit 40 of FIG. 1. It further comprises synchroniser 24 for synchronising the delayed diagnostic signal generated by delay circuitry 23 with respect to the clock to generate a diagnostic reset signal D" that is in effect synchronised with respect to both the system reset signal and the clock. The reset control circuitry 20 also comprises circuitry 25 for synchronising the system reset signal with respect to the synchronised diagnostic reset signal such that a system reset signal is not output before the diagnostic reset signal and a synchroniser 26 for synchronising this signal with respect to the clock to generate a synchronous system reset signal S". Thus, in this embodiment the reset control circuitry or reset synchroniser 20 receives asynchronous system reset signal S' and diagnostic reset signal D' and synchronises them with each other and with the system clock such that a synchronous diagnostic reset signal is output followed by or at about a same time as a synchronous system reset signal.

In the second example the diagnostic reset signal is synchronous while the system reset signal is asynchronous. Thus, in this circuitry synchroniser 24 for synchronising the diagnostic reset signal D' with the clock is not required as this signal is a synchronous signal. All other circuit elements are the same as in the previous example.

In the third example the diagnostic reset signal is asynchronous while the system reset signal is synchronous. Thus, in this circuitry synchronisers 22 and 26 for synchronising the system reset signal S' with the clock are not required as this signal is a synchronous signal. All other circuit elements are the same as in the first example.

Figure 3:
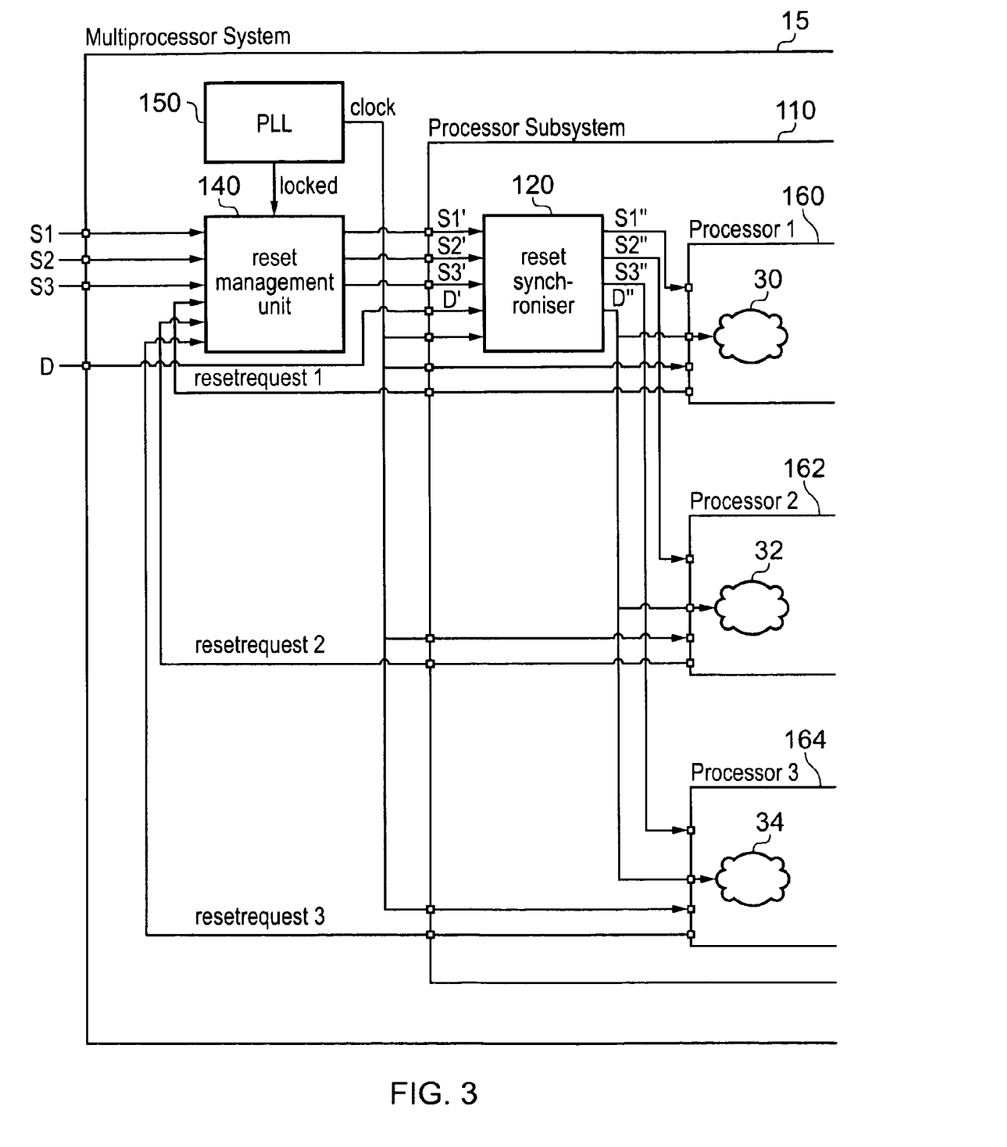
FIG. 3 shows a data processing apparatus having a plurality of processors according to an embodiment of the present invention.

FIG. 3 shows a multiprocessor system having reset control circuitry according to an embodiment of the present invention. Multiprocessor system 15 is similar to FIG. 1 but comprises three processors 160, 162 and 164 the reset of all of which are controlled by reset synchroniser 120. Thus, multiprocessor system 15 comprises a processor subsystem 110, reset synchroniser 120, diagnostic circuitry 30, 32, 34 in each processor 160, 162, 164, a reset control management unit 140 and a phase locked loop 150. Multiprocessor system 15 receives processor reset signals S1, S2, S3 for each processor and a diagnostic reset signal D. These are shown as being input from outside of the multiprocessor system 115. Alternatively, they may be internally generated, either in response to a power on signal or by individual processors in the form of a reset request.

Multiprocessor system 15 comprises reset control management unit 140 which controls the resetting of the system. When reset control management unit 140 detects the assertion of one or more of the reset signals S1, S2 or S3 or reset request 1, 2 or 3 it does not output the asserted signal to the respective processor until it detects that the phase locked loop 150 which clocks the processors and also reset synchroniser 120 has locked. When it detects this it knows that it is safe for the processors to start operating and thus, it transmits the respective delayed system reset signal(s) S1', S2', S3' to reset synchroniser 120 where they are processed and output as system reset signals S1", S2", S3". These signals are used to reset respective processors 160, 162, 164. The circuitry can respond to these several reset signals and provide appropriate delays so that the order they are received in is maintained.

A diagnostic reset signal D may also be received at data processing apparatus 15 and this is passed straight through to reset synchroniser 120. Reset synchroniser 120 may delay the output of the diagnostic reset signal so that it is output as D" after it detects that the delayed system reset signals have been received by the reset synchroniser 120. D", is used to control resetting of diagnostic circuitry 30, 32, 34 within respective processors.

Figure 4:
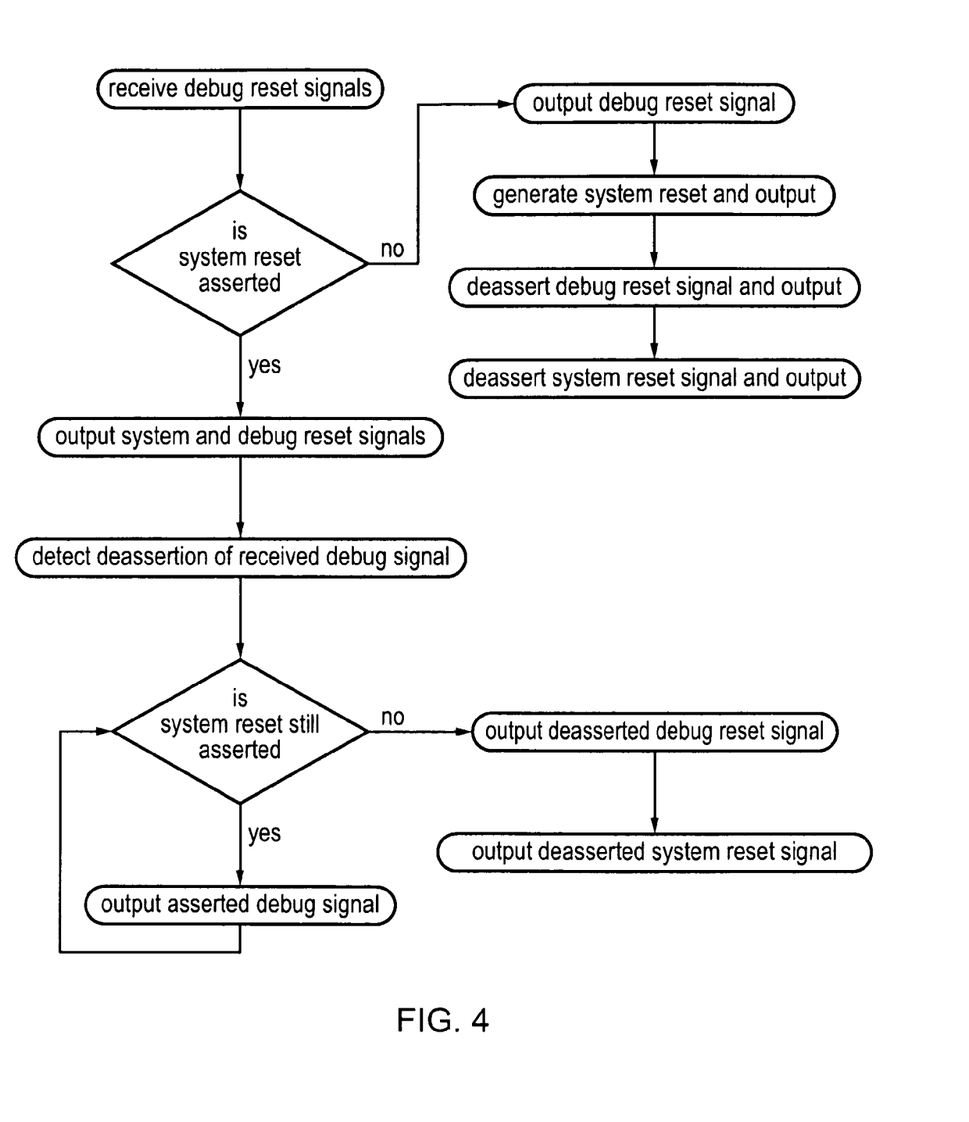
FIG. 4 shows a flow diagram showing steps in a method according to an embodiment of the present invention.

FIG. 4 shows a flow diagram showing a method according to an embodiment of the present invention. This method shows the operation of the reset control circuitry 20 of the previous figures. Initially a debug reset signal is received at this circuitry and the circuitry determines if the system reset is asserted or not. If it is not asserted then the debug reset signal is output and a system reset signal is generated and also output. The debug reset signal is then de-asserted and output and following this the system reset signal is de-asserted and output. In this way, a debug process can be performed wherein the system is reset and the debug of a system is performed during a reset of the signal.

If the system reset is asserted when the debug reset signal is received then the system and debug reset signals are output. The reset control circuitry then monitors the debug signal and detects when it is de-asserted. At this point it then sees if the system reset is still asserted. If it is then rather than outputting the de-asserted debug signal it outputs an asserted debug signal and it continues to do this until it detects that the system reset is no longer asserted. At this point it outputs the de-asserted debug signal and then outputs the de-asserted system reset signal. In this way, the delay of the assertion of a system reset signal following power on owing to resetting of the system waiting for certain elements to come up to speed such as for example a phase locked loop locking causes the debug signal also to be delayed by a similar amount and avoids the debug reset signal causing restarting of the debug circuitry before the system has powered up completely. It should be noted that when the system reset is generated in response to the debug system then a system reset is not detected at the input to the reset control circuitry and thus, there is no delay applied to the debug reset signal and debug can be performed during system reset when system reset is generated in response to the debug signal.

Figure 5:
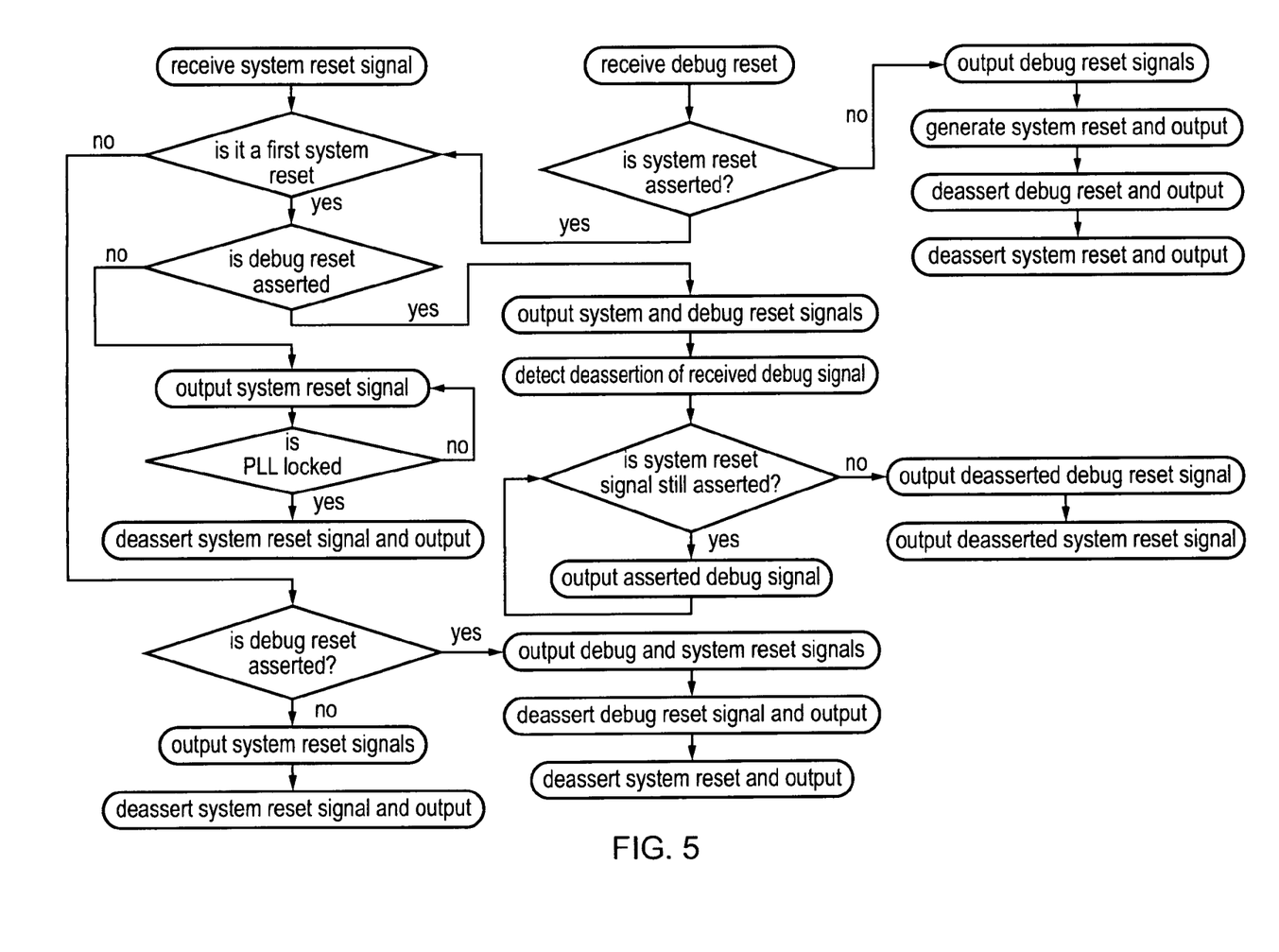
FIG. 5 shows a flow diagram showing steps in a method according to an alternative embodiment of the present invention.

FIG. 5 shows a flow diagram showing a method according to an embodiment of the present invention. This method is very similar to that of FIG. 4, however it comprises the additional step of checking to see if the system reset is a first system reset. This can be done by checking the value stored in data store 22 of FIG. 1. This value indicates if a system reset has already occurred or not. If it is the first system reset then problems with the system needing to initialise, for example the phase locked loop needing time to lock are present and thus, the first system reset may need to be delayed, while this is not a problem for later system resets.

Thus, a system reset is received and the system checks to see if it is a first system reset. If it is then it checks to see if debug reset is asserted. If it is then the system and debug reset signals are output and the system detects for de-assertion of the debug signal. When this is detected rather than outputting it, it checks to see if the system reset is still asserted if it is then it outputs the asserted debug signal. It continues to do this until it detects the system reset signal is no longer asserted, at this point it outputs the deasserted debug reset signal and outputs the deasserted system reset signal, thereby ensuring the debug reset signal is not deasserted before the system reset signal.

If it is the first system reset and debug reset is not asserted then the system reset signal is output until the system detects the PLL is locked, at this point the system reset signal is deasserted and output.

If it is not the first system reset and debug reset is not asserted, then the system reset signal is simply output and when it is deasserted this deasserted signal is output.

If it is not the first system reset and debug reset is asserted, then the system and debug reset signals are output, then the debug reset signal is deasserted and output as is the system reset signal. In this case we do not need to monitor the system reset signal to check that it has deasserted before outputting the debug reset signal as there will be no delay on this signal as it is not the first reset signal of the system and thus, these signals can be deasserted and output as this deassertion occurs.

If a debug reset signal is received and the system reset is not asserted then the debug reset signal is output and a system reset signal is generated and output after this. The debug reset signal is then deasserted followed by the system reset signal, which allows debug of reset.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. Reset control circuitry for controlling a first reset signal for resetting at least a first portion of a circuit and a further reset signal for resetting at least a second portion of said circuit, said reset control circuitry comprising:
an input for receiving an input first reset signal;
an input for receiving an input further reset signal;
an output for outputting an output first reset signal; and
an output for outputting an output further reset signal;
said reset control circuitry being responsive to detecting deassertion of said input first reset signal when said input further reset signal is asserted to delay deassertion of said output first reset signal so that said output first reset signal is deasserted at a same time or later than said input further reset signal.

2. Reset control circuitry according to claim 1, wherein said reset control circuitry is responsive to receiving said input first reset signal and said input further reset signal to output said input first reset signal as said output first reset signal and to output said input further reset signal as said output further reset signal when said reset control circuitry does not detect deassertion of said input first reset signal when said input further reset signal is asserted.

3. Reset control circuitry according to claim 1, wherein said reset control circuitry is responsive to detecting deassertion of said input first reset signal when said input further reset signal is asserted to control deassertion of said output further reset signal such that said output further reset signal is deasserted at a same time or later than said output first reset signal.

4. Reset control circuitry according to claim 1, wherein said input first reset signal and said input further reset signal comprise asynchronous reset signals, said reset control circuitry comprising synchronising elements such that said output first reset signal comprises a synchronous signal synchronised to a clock clocking said at least a first portion of said circuit and said output further reset signal comprises a synchronous signal synchronised to a clock clocking said at least a second portion of said circuit.

5. Reset control circuitry according to claim 1, wherein said first reset signal comprises a signal synchronous to a clock clocking said at least a first portion of said circuit and said further reset signal comprises a reset signal synchronous to a clock clocking said at least a second portion of said circuit.

6. Reset control circuitry according to claim 1 wherein said at least a first portion of said circuit comprises diagnostic circuitry and said at least a second portion of said circuit comprises a processor associated with said diagnostic circuitry.

7. Reset control circuitry according to claim 1, said further reset signal comprising a plurality of further reset signals, said reset control circuitry being responsive to detecting deassertion of said input first reset signal when at least one of said plurality of input further reset signals is asserted to delay deassertion of said output first reset signal so that said output first reset signal is deasserted at about a same time or later than a latest deassertion of said at least one of said plurality of input further reset signals.

8. Reset control circuitry according to claim 1, said reset control circuitry being responsive to detecting assertion of said input first reset signal when said input further reset signal is not asserted to output said input first reset signal and to assert said output further reset signal.

9. Reset control circuitry according to claim 1, said reset control circuitry further comprising a storage element for storing a value indicating said input further reset has previously been asserted, said reset control circuitry being responsive to detecting deassertion of said input first reset signal when said input further reset signal is asserted for a first time following power up such that said value is not stored in said storage element to delay deassertion of said output first reset signal so that said output first reset signal is deasserted at a same time or later than said input further reset signal and not to delay deassertion of said output first reset signal when said value is stored in said storage element.

10. Reset control circuitry according to claim 6, wherein said input first reset signal comprises a reset signal generated in response to power on.

11. Reset control circuitry according to claim 10, wherein said first reset signal comprises a diagnostic reset signal, said diagnostic reset signal being generated in response to power on and in response to at least one further condition.

12. Reset control circuitry according to claim 6, wherein said further reset signal comprises a processor reset signal.

13. Reset control circuitry according to claim 7, wherein said reset control circuitry is responsive to detecting deassertion of said input first reset signal when at least one of said plurality of input further reset signals is asserted to control deassertion of at least one of said plurality of output further reset signals corresponding to said at least one of said asserted input further reset signal such that said at least one of said plurality of output further reset signals is deasserted at a same time or later than said output first reset signal.

14. A data processing apparatus comprising:
  a reset management unit;
  a processor;
  associated diagnostic circuitry and
  reset control circuitry according to claim 6; wherein
  said reset management unit is arranged to receive said further reset signal and to delay deassertion of said further reset signal in dependence upon at least one detected condition of said data processing apparatus, said reset management unit being arranged to output said delayed reset signal to said input for receiving said further reset signal of said reset control circuitry.

15. A data processing apparatus according to claim 14, said data processing apparatus being configured to generate said first reset signal and said further reset signal in response to a power up signal.

16. A data processing apparatus according to claim 14, said data processing apparatus further comprising a phase locked loop wherein said at least one detected condition of said data processing apparatus comprises said phase locked loop not being in a stable locked state.

17. A data processing apparatus according to claim 14, said data processing apparatus further comprising at least one further processor, wherein said further reset signal comprises a system reset signal for resetting said processor and said at least one further processor.

18. A data processing apparatus according to claim 14, said data processing apparatus further comprising at least one further processor, wherein said further reset signal comprises a plurality of further reset signals for resetting said processor and said at least one further processor, said reset control circuitry being responsive to detecting deassertion of said input first reset signal when at least one of said plurality of input further reset signals is asserted to delay deassertion of said output first reset signal so that said output first reset signal is deasserted at about a same time or later than a latest deassertion of said at least one of said plurality of input further reset signals.

19. A data processing apparatus according to claim 14, said reset control circuitry being responsive to detecting reassertion of said input first reset signal when said input further reset signal is no longer asserted to output said input first reset signal and to reassert said output further reset signal.

20. A method of controlling a first reset signal deassertion of which triggers resetting of at least a first portion of a circuit and a further reset signal deassertion of which triggers resetting of at least a second portion of said circuit, comprising the steps of:
  receiving said first reset signal and said further reset signal;
  in response to detecting deassertion of said input first reset signal when said input further reset signal is asserted delaying deassertion of said output first reset signal so that said output first reset signal is deasserted at about a same time or later than said input further reset signal;
  outputting said first reset signal and said further reset signal.

21. Reset control means for controlling a first reset signal for resetting at least a first portion of a circuit and a further reset signal for resetting at least a second portion of said circuit, said reset control means comprising:
  an input means for receiving an input first reset signal;
  an input means for receiving an input further reset signal;
  an output means for outputting an output first reset signal; and
  an output means for outputting an output further reset signal;
  said reset control means being responsive to detecting deassertion of said input first reset signal when said input further reset signal is asserted to delay deassertion of said output first reset signal so that said output first reset signal is deasserted at a same time or later than said input further reset signal.

* * * * *